July 26, 1932.     C. R. WATTS     1,868,510

STEAM RADIATOR TRAP

Filed July 25, 1928

INVENTOR.
CHAS. R. WATTS
BY Joseph B. Gardner
HIS ATTORNEY

Patented July 26, 1932

1,868,510

UNITED STATES PATENT OFFICE

CHARLES R. WATTS, OF BERKELEY, CALIFORNIA, ASSIGNOR OF ONE-THIRD TO EDWARD L. WATTS AND ONE-THIRD TO CHARLES R. WATTS, JR., BOTH OF BERKELEY, CALIFORNIA

STEAM RADIATOR TRAP

Application filed July 25, 1928. Serial No. 295,227.

The invention relates to a device for effecting an automatic trapping and discharge of air and condensate from a steam radiator without permitting an escape of uncondensed steam therefrom.

An object of the invention is to provide a trap having a thermostatic element controlling the discharge of condensate flowing from the radiator into the trap, in which the transfer of heat energy in the form of steam from a radiator to the element for the purpose of actuating said element is governed directly by the flow of condensate from the radiator rather than by the temperature of the steam in the radiator.

Another object of the invention is to provide a trap of the class described in which the ports of the valve controlling the escape of the condensate from the trap will practically invariably be below the surface of the water flowing through the trap, thus preventing live steam from escaping from the radiator through the trap and also establishing a direct relation between the opening to the ports and the flow of the condensate therethrough.

A further object of the invention is to provide a trap of the class described in which the transfer of heat energy in the form of steam from a radiator to a thermostatic element disposed in the trap and governing the escape of the condensate from the trap, is automatically controlled by a very small amount of condensate to be supplied from the radiator, thus effecting a quick change in the temperature of the thermostatic element when necessary and a quick complete sealing of the trap from the radiator when the temperature of the steam in the latter is excessive—preventing the thermostatic element from injury by the hot steam.

A still further object of the invention is to provide a trap of the class described which can be used with radiators of different radiating capacities and consequently having different relation between the temperature of the steam and the amount of condensate by operating to dispose of the condensate at the rate of formation of the latter and independently of the temperature of steam.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
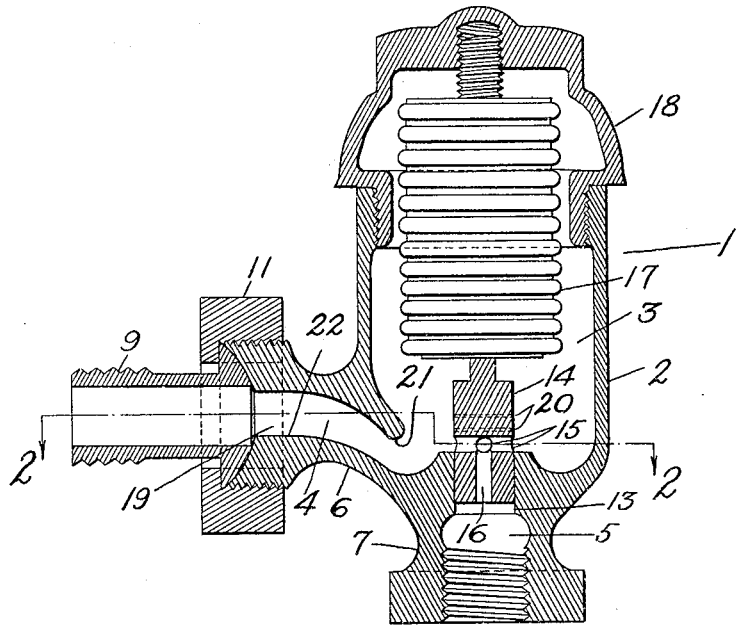
Figure 1 is a side sectional view of the trap embodying the invention.
Figure 2:
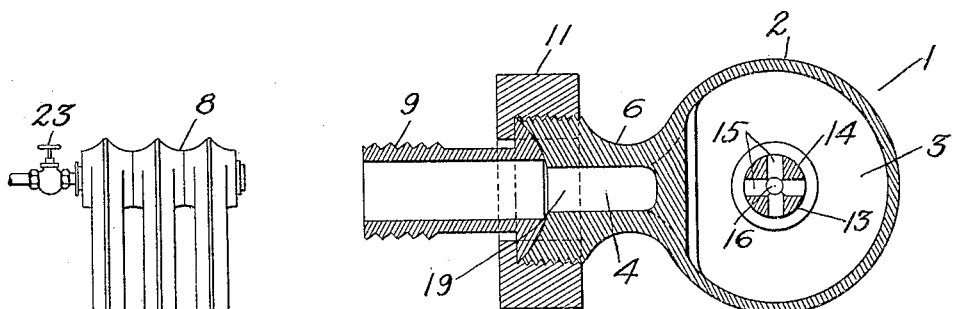
Figure 2 is a plan sectional view of the trap taken on the line 2—2 of Figure 1.
Figure 3:
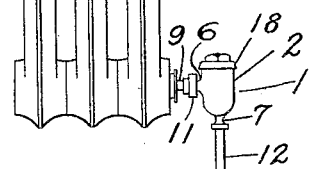
Figure 3 is a reduced view showing the trap operatively associated with a steam radiator.

Generally and as shown, the trap 1 of my invention comprises a body member 2 defining a chamber 3 and having an inlet 4 and an outlet 5 which communicate with the chamber and extend through branches 6 and 7 respectively of the body. Connection between the trap and a radiator 8 with which the former is associated is by means of a return outlet pipe 9 of the radiator which is connected to the branch 6 by a coupling 11. The lower portion of the outlet branch 6 is threaded to receive an exhaust pipe 12 in which a certain degree of vacuum is preferably maintained, while the upper portion of the outlet forms a bore 13. Mounted for reciprocation in the bore and arranged for controlling the outlet 5 is a valve 14 having ports 15 and 16 formed therein and providing communication between the chamber 3 and the outlet 5. The port 16 leading to the exhaust pipe is generally vertical and in its upper extremity convergent with the ports 15 which are radially disposed and designed to open into the chamber. Closing of the ports 15 is effected by engagement thereof with the walls of the bore 13 as when the valve is lowered, sealing grooves 20 being formed in the valve above the ports so as to prevent any leakage of water or steam when the valve is in closed position. Movement of the valve is arranged to be effected upon variation in temperature of the chamber, and for this purpose the valve is fixedly associated with a thermostatic element 17 which is adjustably secured to a cap 18 of the body 2 and is caused to expand and contract axially of the valve upon said temperature variation.

As will be noted, by reference to Figure 1, the portion 19 of the inlet 4 adjacent the return outlet 8 has its axis generally horizontal, while the portion adjacent the chamber curves downwardly so that the top or upper surface 21 of the orifice of the inlet to the chamber will be slightly below the level of the bottom 22 of the portion 19. Furthermore, the bottom 22 is so positioned that it will be slightly above the level of the top surface of the ports 15 when the valve is in its highest position. In this manner, under operating conditions the ports will be completely covered by water when condensate is flowing from the radiator.

With the radiator cold, the valve 14 will be disposed in its upper position, as indicated in Figure 1, thereby leaving the ports fully open. However when steam is introduced into the radiator as by opening the inlet valve 23 thereof, practically complete condensation of the steam will follow, and the condensate thus formed will, together with the air, discharge into the trap and escape therefrom through the ports. After the walls of the radiator have been become heated, uncondensed steam will reach the trap causing the thermostatic element to expand and to move the valve downwardly until the ports 15 and one of the grooves 20 are closed by the walls of the bore. With the trap outlet thus sealed the water of condensation trapped in the chamber quickly rises and reaches the surface 21 so as to seal the trap from the radiator. The chamber now being completely sealed, the steam imprisoned therein begins to condense, losing its heat by radiation from the walls of the trap body and causing the thermostatic element to contract and to move the valve upwardly, thereby reopening the ports. The inlet 4, and the valve ports when fully opened are large enough to permit the discharge of at least the maximum amount of condensate that may be formed in the radiator during the normal operation thereof, and since the ports are completely submerged, the amount of condensate discharging therethrough will invariably be proportional to the portion of the ports which is exposed. It will therefore be understood that if the ports now become opened to such an extent as to permit the escape of more condensate than is being supplied from the radiator, the level of the water will fall thereby defining between the water surface and the surface 21 a narrow passage through which steam will immediately enter the chamber, thereby causing a downward movement of the valve and a partial closing of the ports. If in the downward travel the valve closes the ports to such an extent as not to allow all of the condensate being formed in the radiator to escape through said ports, the condensate will accumulate at the bottom of the chamber and narrow the passage between the water surface and the surface 21. The narrowed passage will reduce the supply of steam causing the thermostatic element to contract and to open the ports.

It is clear from the above that for any amount of condensate flowing from the radiator an equilibrium will be reached in which just sufficient steam will be admitted into the chamber to supply the losses by radiation from the walls of the trap, thus maintaining the chamber at a constant temperature and causing the valve to assume a position with the ports open just sufficiently for permitting all of the condensate to escape therethrough.

It will be seen that in the operation of my device, because of the fact that the ports are arranged to be completely submerged in the condensate while the latter flows from the radiator, no steam may escape from the trap. Furthermore, as previously noted, this arrangement of the ports is also advantageous in that the amount of condensate escaping therethrough is always proportional to the area of the opening of the ports. Thus any change in the opening of the ports not due to a change in the amount of condensate supplied from the radiator, operates to change the level of the water in the chamber thereby changing the amount of steam admitted into the chamber and causing the valve to resume its original and correct position. If, for example, the temperature of the steam in the radiator rises, while the amount of condensate is being supplied at the same rate, the ports will partially close, and the water level will rise until just sufficient steam is admitted into the chamber to cause the valve to resume its original position. At this new and higher level the water in the chamber will remain due to the fact that it now escapes at the rate at which it is being supplied. This feature of the trap obviates the necessity of an extremely fine adjustment of the position of the valve or of the rate of expansion of the thermostatic element. It also follows that traps of the same size and without any readjustment may be used on radiators of different radiating capacities and therefore of different relations between the temperature of the steam and the amount of condensate, the limit being set by the amount of water dischargeable through the maximum opening of the ports.

I claim:

1. In a trap for condensate of a steam radiator, a body having a chamber provided with a steam and condensate inlet thereto from the radiator and a substantially vertically disposed outlet for condensate, the plane of the bottom of the inlet at one portion thereof being lower than the plane of the bottom at a different portion, a valve movable in and controlling said outlet provided with ports communicating with said chamber and arranged to be continuously open into the chamber and in the uppermost position of the valve to lie below said higher bottom of the inlet, so as to be completely submerged in the condensate, and a thermostatic element disposed in, and actuated by the temperature of, said chamber connected to said valve arranged upon the introduction of steam into the chamber to move said valve downwardly to effect a closure of said ports and to move said valve upwardly to uncover said ports upon a decrease in the temperature in the chamber.

2. In a trap for condensate of a steam radiator, a body having a chamber provided with a steam and condensate inlet having the bottom of the orifice into the chamber lower than the highest point of the bottom of the inlet whereby the level of the condensate in the chamber may be independent of the amount of condensate flowing from the radiator and be changed by any difference between the flow of the condensate into and the flow thereof from the trap, the upper portion of said orifice being located in a plane below said highest point of the bottom of the inlet whereby the amount of steam admitted through said inlet may be controlled during the flow of a minimum amount of condensate through said inlet, such chamber communicating with a condensate outlet, a valve movable in said outlet and having ports communicating with said chamber arranged to be continuously open into the chamber and in all positions of the valve to be submerged in the condensate in the chamber during the flow of condensate thereto, and a thermostatic element fixed to said body and to the valve arranged to depress the valve and effect a closure of the ports thereof upon admission of steam to the chamber and to elevate the valve upon a decrease in temperature in the chamber whereby said ports will be uncovered and condensate allowed to escape into the outlet.

3. In a trap for condensate of a steam radiator, a body having a chamber provided with a steam and condensate inlet and having an outlet orifice at the lower extremity of said chamber, said orifice being disposed at a lower elevation than the highest point of the bottom of the inlet, and said inlet having a portion thereof intermediate said point and chamber disposed at a lower elevation than said orifice.

4. In a trap for condensate of a steam radiator, a body having a chamber provided with a steam and condensate inlet and having an outlet orifice at the lower extremity of said chamber, said orifice being disposed at a lower elevation than the highest point of the bottom of the inlet, and said inlet having a portion thereof intermediate said point and chamber disposed at a lower elevation than said orifice, said last named portion extending into said chamber and arranged to surround said orifice.

In testimony whereof, I have hereunto set my hand at Oakland, California, this 18th day of July, 1928.

CHARLES R. WATTS.